(12) United States Patent
Reichenbach et al.

(10) Patent No.: US 7,721,964 B2
(45) Date of Patent: May 25, 2010

(54) APPARATUS AND METHOD FOR MONITORING MOVED OBJECTS

(75) Inventors: Jürgen Reichenbach, Emmendingen (DE); Thomas Schopp, Freiburg (DE); Hans-Werner Pierenkemper, Emmendingen (DE)

(73) Assignee: Sick AG, Waldkirch (DE)

( * ) Notice: Subject to any disclaimer, the term of this patent is extended or adjusted under 35 U.S.C. 154(b) by 932 days.

(21) Appl. No.: 11/248,121

(22) Filed: Oct. 11, 2005

(65) Prior Publication Data

US 2006/0076415 A1   Apr. 13, 2006

(30) Foreign Application Priority Data

Oct. 11, 2004   (DE) ........................ 10 2004 049 482
May 11, 2005   (EP) ................................ 05010273
Sep. 15, 2005   (EP) ................................ 05020110

(51) Int. Cl.
*G06K 7/14* (2006.01)

(52) U.S. Cl. ........................................ 235/454

(58) Field of Classification Search ...............
235/462.01–462.49, 454
See application file for complete search history.

(56) References Cited

U.S. PATENT DOCUMENTS

| | | | |
|---|---|---|---|
| 5,311,999 A | | 5/1994 | Malow et al. |
| 5,912,698 A | | 6/1999 | Graulich et al. |
| 6,122,001 A | * | 9/2000 | Micaletti et al. ............... 348/91 |
| 6,880,758 B2 | * | 4/2005 | Park et al. ............... 235/462.25 |
| 2003/0127518 A1 | * | 7/2003 | Park et al. ............... 235/462.25 |
| 2003/0206305 A1 | | 11/2003 | Gagliano |

FOREIGN PATENT DOCUMENTS

| | | |
|---|---|---|
| DE | 197 27 459 A1 | 6/1997 |
| DE | 199 46 476 A1 | 9/1999 |
| DE | 101 13 641 A1 | 3/2001 |
| DE | 101 26 086 A1 | 5/2001 |
| DE | 101 48 062 A1 | 9/2001 |
| DE | 101 54 861 A1 | 11/2001 |
| DE | 102 29 408 A1 | 6/2002 |
| DE | 102 31 178 A1 | 7/2002 |
| DE | 103 04 054 A1 | 2/2003 |
| DE | 103 12 972 A1 | 3/2003 |
| DE | 10 2004 008 925 A1 | 2/2004 |
| EP | 0647479 A2 | 4/1995 |
| EP | 0833270 B1 | 4/1998 |

(Continued)

*Primary Examiner*—Jamara A Franklin
(74) *Attorney, Agent, or Firm*—Townsend and Townsend and Crew, LLP

(57) ABSTRACT

The invention relates to an apparatus and a method for the sensing of objects moved through the field of view of an optical sensor comprising a device for the selection of regions of interest which are each associated only with a part of the field of view of the optical sensor, wherein a distance measurement device and/or a remission measurement device is/are integrated into the optical sensor or is/are connected in front of it or after it in the direction of movement of the objects, with the distance measurement device and/or the remission measurement device being designed for the determination of the spacing and/or of the remission of the object surfaces facing the distance measurement device and/or the remission measurement device and being coupled to an evaluation circuit for the calculating of the regions of interest in dependence on the determined spacings and/or remissions.

41 Claims, 4 Drawing Sheets

FOREIGN PATENT DOCUMENTS

| | | |
|---|---|---|
| EP | 0984382 A2 | 3/2000 |
| EP | 1343110 A2 | 9/2003 |
| EP | 1431707 A1 | 6/2004 |
| JP | 10210354 | 8/1998 |
| WO | WO 02/07904 A1 | 1/2002 |

* cited by examiner

APPARATUS AND METHOD FOR MONITORING MOVED OBJECTS

CROSS-REFERENCE TO RELATED APPLICATIONS

This application claims the benefit of German Patent Application No. DE 10 2004 049 482.7, filed on Oct. 11, 2004. The disclosure of the above application is incorporated herein by reference.

FIELD AND BACKGROUND OF THE INVENTION

The invention relates to an apparatus and to a method for the sensing of objects moved through the field of view of an optical sensor comprising a device for the selection of regions of interest which are each only associated with a part of the field of view of the optical sensor.

With apparatus or methods of this type, which use camera systems for example, it is frequently necessary to evaluate the sensed image data in real time or at least at very high speed, which has the consequence that a high calculating power must be available to the evaluation system, which is associated with a corresponding economic effort. To reduce the required calculating power, it is known to identify those regions of the recorded images which are of special interest by means of a pre-processing stage prior to the actual evaluation of the sensed image data. Regions of interest of this type are as a rule known as "ROIs" (regions of interest).

After the ROIs have been defined by means of the pre-processing stage, it is possible to limit oneself within the framework of the actual evaluation circuit only to processing the sensed image data of these ROIs, which requires correspondingly less calculating power than the processing of the complete images recorded by the optical sensor or by the camera.

In accordance with the prior art, the ROIs are determined via a pre-processing of the complete sensed image data, with simple algorithms being used here due to the high image data flow which, for example, only determine whether the gray value of a pixel lies above a predetermined threshold value. If this is the case, the checked pixel is associated with an ROI; otherwise, it is not taken into account in the further evaluation. Algorithms of this type suffer, among other things, from the disadvantage that the respective condition—in the aforesaid example the exceeding of a predetermined threshold value—is not always reliably satisfied since, for example, an object of interest to be sensed is not necessarily always brighter than the background surrounding the object. In cases of this type, the said algorithms cannot be used or can only be used with restrictions.

SUMMARY OF THE INVENTION

It is an object of the present invention to further develop an apparatus and a method of the initially named kind such that the regions of interest (ROIs) can be detected with a reliability which is as high as possible within the field of view of an optical sensor, with it also having to be possible in specific variants of the invention to generate additional information which relates to the regions of interest (ROIs) or to the total objects.

In particular, this object is satisfied in that a distance measurement device and/or a remission measurement device is/are integrated into the optical sensor or is/are connected in front of it or after it in the direction of movement of the objects and in that the distance measurement device and/or the remission measurement device is/are designed for the determination of the spacing and/or of the remission of the object surfaces facing the distance measurement device or the remission measurement device and is/are coupled to an evaluation circuit for the calculation of the regions of interest in dependence on the spacings and/or remissions determined.

This object is furthermore satisfied in that a method for the sensing of objects moved through the field of view of an optical sensor is used, wherein regions of interest are selected which are each only associated with a part of the field of view of the optical sensor, with the spacing and/or the remission of the object surfaces facing the distance measurement device or the remission measurement device being determined using a distance measurement device and/or a remission measurement device integrated into the optical sensor or connected in front of it or after it in the direction of movement of the objects, whereupon the regions of interest are calculated in dependence on the spacings and/or remissions determined by means of an evaluation circuit.

In accordance with the invention, the image data determined by the optical sensor are therefore not used at all for the determination of the ROIs; a separate device, namely a distance measurement device and/or a remission device, is rather used which is capable of determining its distance from the surfaces facing it and/or the remission behavior of these surfaces. If the spacing between the distance measurement device and the surface on which the objects to be sensed are lying and/or the remission behavior of this surface are then furthermore known, the positions of those regions sensed by the distance measurement device can be determined without problem in which the spacing determined or the remission determined does not coincide with the spacing from the background or with its remission. These regions are then ROIs in which an object is present. The position information of the ROIs determined in the manner in accordance with the invention can then be used within the framework of the evaluation circuit to evaluate only those image contents sensed by the optical sensor which are associated with the previously determined ROIs.

The evaluation circuit used in accordance with all variants of the invention can be a separate component or also an element of the optical sensor or of the distance measurement device and/or of the remission measurement device. The evaluation circuit can represent an individual component which calculates both the regions of interest and the resolution or the magnification factor. Alternatively, separate components of the evaluation circuit which are spatially remote from one another can also be used for the calculation of the regions of interest, on the one hand, and for the calculation of the resolution or of the magnification factor, on the other hand.

Since the determination of the spacing between the distance measurement device provided in accordance with the invention and the object surfaces to be scanned is completely independent of the reflectance, the quality and the color of the object surfaces and of the background surrounding the objects on the use of a purely distance measurement device which does not take account of the remission behavior, it can be determined with very high reliability with this variant in accordance with the invention where objects to be sensed are located, without making use of calculating capacity of the evaluation circuit in a relevant manner for this purpose.

The calculating power of the evaluation circuit can be designed in all variants in accordance with the invention such that it is capable of processing the image data of the ROIs at the respectively required speed, optionally in real time. A higher calculating power is not necessary, since—as mentioned—the ROIs can be determined in accordance with the invention so-to-say without taking up the calculating capacity of the evaluation circuit.

A distance measurement device used in accordance with the invention can consist of one or more units and must be capable of determining spacings from different points of the surface of the objects to be sensed. A remission measurement device used in accordance with the invention can also consist in a corresponding manner of one or more units. A remission measurement device of this type must also be capable of determining remission values from different points of the surface of the objects to be sensed. In addition to the spacings or to the remission values, position information associated with the respective spacing values or remission values must then be known or be able to be determined so that it can be determined at which locations object regions are present in order to be able to take these regions into account as ROIs in the following.

A particularly precise operation of the apparatus in accordance with the invention can be achieved when the distance measurement device or the remission measurement device or an arrangement of a plurality of distance measurement devices or remission measurement devices is/are capable of determining the spacing values or remission values to or from as many points of the object surfaces as possible which lie as close to one another as possible, with it being particularly advantageous if a complete scanning of the object surfaces is permitted.

It is particularly preferred for the distance measurement device or the remission measurement device used in accordance with the invention to be itself designed not only for the determination of spacings but additionally also for the determination of associated position information. Accordingly the distance measurement device or the remission measurement device is preferably made as a scanner, in particular as a laser scanner. A scanner, which can be made as a line scanner or as an areal scanner, permits the complete scanning of objects, with present position information being able to be determined, for example in the form of polar coordinates, for each spacing value or remission value determined. It is furthermore advantageous for scanners of this type to be commercial devices so that an apparatus in accordance with the invention can be realized economically with them.

A laser scanner used in accordance with the invention is preferably designed for the transmission of a laser beam moved periodically within a scanning plane. If an object to be sensed is moved through this scanning plane, it is possible to scan the object completely and to determine a three-dimensional vertical profile of the object. The position of this vertical profile in the total surface scanned then corresponds to an ROI.

The scanning plane of the laser scanner can extend perpendicular or obliquely to the direction of movement of the objects. It is only important that the scanning plane is oriented relative to the objects to be sensed such that the laser beam can reach all object surfaces facing the laser scanner.

It is particularly preferred for the measuring device used in accordance with the invention not only to be able to determine spacings and associated position information, but also in addition the remission behavior of the sensed object regions. In this case, it e.g. becomes possible to segment the ROIs fixed in accordance with the invention even further in dependence on the determined remission behavior and to fix regions of particular interest within the ROIs. Only these regions of particular interest can then, for example, be examined in the further evaluation. By the investigation of the remission behavior of a determined ROI it can, for example, specifically be determined within this ROI at which position a code, for example a barcode, is located. The evaluation circuit can then be restricted to examining only that region in which the code is located, which requires correspondingly less calculating power than the examination of the complete object surface determined as an ROI. In accordance with the explained preferred variant in accordance with the invention, the regions ultimately of particular interest and to be processed further are therefore calculated in dependence on the spacings determined and on the remission behavior determined.

It is furthermore advantageous for the evaluation circuit to be designed to take account of the depth of field range of the optical sensor such that only those regions of interest can be determined in which the object surface is located in the depth of field range of the optical sensor. This invention variant can be realized without problem when the evaluation circuit knows the spacing values corresponding to the depth of field range, since in this case all those regions of the object surface can remain out of consideration in the evaluation whose spacings to the distance measurement device lie outside the depth of field range of the optical sensor. In this manner, the required calculating power of the evaluation circuit can be reduced even further since, in the evaluation, regions of the object surfaces lying inside the ROIs can also remain out of consideration when they are located outside the depth of field range. Calculating power is only needed for those object surface regions which lie inside a determined ROI, on the one hand, and also lie inside the depth of field range, on the other hand.

The optical sensor used within the framework of the invention can, for example, be made as a camera, in particular as a line camera or a matrix camera, or also as a barcode scanner. It is particularly advantageous for a line camera to be used in conjunction with a distance measurement device made as a laser scanner since the scanning or sensing planes of both apparatus can then be aligned with one another such that they sense the objects inside their respective fields of view at respectively the same positions so that the positions of the ROIs determined via the laser scanner can be further processed directly as position information for the line camera, without a transformation having to take place between different coordinate systems of both devices. It is, however, equally also possible to integrate the optical sensor and the distance measurement device or the remission measurement device into one single device with a common housing so that an alignment of the optical sensor and of the distance measurement device or of the remission measurement device to one another which takes place on site can be omitted. In this case, the aforementioned transformation can furthermore likewise be saved.

The objects moved through the field of view of the optical sensor in accordance with the invention can be moved by means of a conveying device, in particular by means of a conveyor belt. The conveying device is preferably operated at a constant speed. The distance measurement device or the remission measurement device used in accordance with the invention can be attached above the conveying device, but also to the side of the conveying device, depending on whether surfaces or side surfaces of objects should be sensed.

If the position of ROIs is determined via the distance measurement device or the remission measurement device used in accordance with the invention, it can be calculated in an easy manner via the speed of the conveying device and via the spacing between the fields of view or scanning planes of the distance measurement device or the remission measurement device and the optical sensor at which time the ROI determined via the distance measurement device or the remission measurement device is located in the field of view of the optical sensor and where the determined ROI lies within this field of view.

It is necessary for a real time image processing to connect the distance measurement device or the remission measurement device in front of the optical sensor in the conveying direction or to integrate both devices in a single housing since the positions of the ROIs in this case already have to be known when or shortly after the objects enter into the field of view of the optical sensor. If no real time processing is required, it is generally also possible to connect the distance measurement device after the optical sensor in the conveying direction of the objects.

The resolution or the magnification factor of the images sensed by the optical sensor can be calculated from the spacings delivered by the distance measurement device so that it is, for example, known on a further processing of the ROIs at which dpi resolution the images sensed by the optical sensor are available. If e.g. letters or numerals present in the ROIs and having respectively defined absolute sizes on the sensed objects should be recognized by means of automated image processing algorithms, a piece of information is available to the respective image processing algorithm to the effect of which size the letters or numerals to be recognized have, measured in pixels of the images sensed. The efficiency of the respective image processing algorithm can hereby be improved.

The evaluation circuit can additionally be designed in accordance with the invention for the determination of the geometry of the objects, which take place in dependence on the determined spacings. If required, the volume of the sensed objects can then also be calculated from this information. In many applications present in practice, laser scanners are anyway used to determine the volumes of objects conveyed past these laser scanners. In applications of this type, the apparatus in accordance with the invention can be used particularly economically since no additional apparatus effort has to be employed, but rather the realization of an apparatus in accordance with the invention can take place only by a reprogramming of the evaluation circuit likewise present as a rule either inside the laser scanner or as a separate component.

It is furthermore of advantage for a camera focusing device to be provided which is acted on in dependence on the spacings determined. It can be ensured in this manner that a camera used as an optical sensor is always focused on the respective object surface of interest.

Furthermore, an object illumination device can be provided which can be controlled via the evaluation circuit such that ROIs are illuminated and regions not of interest are not illuminated. The light sources of the object illumination device are put under less strain by a selective illumination of this type so that their service life can be increased. It is, however, equally possible to control the object illumination device via the evaluation circuit so that ROIs are illuminated more strongly than regions not of interest. The image quality of the images sensed by the optical sensor or, for example, also the reading rate of a barcode scanner used can be increased by an illumination intensity increased in this manner in the region of the ROIs. Since regions not of interest are illuminated less strongly, the light sources are overall not exposed to more strain by the total measure so that their service life is not negatively influenced by the increased intensity of illumination in the region of the ROIs.

The variants of the control of the object illumination explained above can be used particularly advantageously when the light sources of the object illumination device are made as LEDs. The explained measures have a particularly advantageous effect here since the service life of LEDs is generally limited.

In accordance with the invention, it is furthermore of advantage for the optical sensor and/or the evaluation circuit to be equipped with a data interface which is suitable for the transmission of the data related to regions of interest to an external device. An external device of this type can, for example, be suitable for the automated decoding of characters and/or for the optical presentation of image regions with characters not decodable in an automated manner.

It becomes possible by the said data interface to reduce the amount of data transmitted to an external device for further processing to the requirement minimum so that the external device is not put under unnecessary strain in the further processing of these data, but only to the respective extent required. This is particularly advantageous, for example, when the external device is designed to present such image regions visually to a person, said image regions not being able to be decoded in an automated manner, since, in this case, the said person is not put under the strain of observing image regions which do not represent information to be decoded or which represent the characters already previously decoded in an automated manner.

When the said data interface is used, it is particularly preferred for the optical sensor and/or the evaluation circuit to be fitted with a compression stage for the compression of the data related to regions of interest and to be transmitted via the data interface. The volume of the data to be transmitted to an external device can be additionally reduced with a compression stage of this type after a restriction to the regions of interest. It is particularly desirable in this respect for the compression stage to be designed for the compression of image data relating to regions of interest actually during the detection of the respective image. In this manner, the compression practically takes place at the earliest possible time, since it takes place at least largely during the image sensing so that the data are also available at the external device at a very early time, which ultimately has the result that more time is available for the further processing by the external device.

The compression during the sensing can take place using different processes:

When the optical sensor is designed as a line camera, it is, for example, possible to compress every completely received image line relating to a region of interest directly after its sensing.

Alternatively, it is possible to compress a predetermined number of completely received image lines relating to a region of interest directly after the sensing of the said number of image lines.

Finally, it is also possible, for example, to compress a predetermined number of received pixels of one or more image lines relating to a region of interest directly after the sensing of the said number of pixels.

Other embodiment variants are likewise conceivable.

It is particularly preferred for at least two optical sensors to be provided which sense the moved objects at different viewing angles.

In this case, two or more optical sensors are used to sense the objects at different viewing angles. This is, for example, in particular advantageous when ROIs to be sensed are arranged on an object surface remote from a sensor. ROIs of this type can then be sensed by the at least one further sensor so that the reliable sensing of ROIs can be ensured by the use of a plurality of sensors independently of the alignment and position of the objects on a conveyor means.

When a plurality of optical sensors is used, their optical axes can stand perpendicular to one another. In this manner, for example, a total of three sensors can be provided of which one looks from above and the other two look from a respective side onto objects moved along a conveyor means.

The optical axes of the optical sensors can extend perpendicular or obliquely to the direction of movement of the objects. If, for example, the optical axis of a sensor has an angle of approximately 45° to the direction of movement of the objects, an optical sensor of this type is capable, for example, of simultaneously sensing two sides of a parallelepiped object which is aligned on a conveyor means such that two mutually oppositely disposed sides of this object extend substantially parallel to the direction of movement of the object.

To ensure that at least one sensor looks from above onto the moved objects, the optical axis of an optical sensor can extend perpendicular to the conveying plane.

It is advantageous for the plurality of optical sensors to be connected to one or more evaluation circuits via a data network. This makes it possible that, for example, an evaluation circuit processes the data of a plurality of sensors or that, for example, with a particularly high data throughput, two or more evaluation circuits jointly process the data of an optical sensor. Furthermore, in the operation of the apparatus in accordance with the invention, in this case alternating associations between the optical sensors and the evaluation circuits can also be carried out.

It is in particular possible to associate a separate evaluation circuit with each optical sensor, which increases the speed of the total apparatus and in particular permits a real-time processing of the sensed data.

The plurality of optical sensors can be connected to the evaluation circuit or evaluation circuits in a star shape via a data network. Alternatively, it is, however, also possible to provide an optical sensor and an evaluation sensor associated with it in a respective network branch, with the outputs of the said evaluation circuits being led to a common network node which is in turn connected to a further processing station. The latter variant has the disadvantage with respect to a star-shaped networking that an evaluation circuit can always only access the data of the optical sensor arranged in the same network branch.

Every evaluation circuit provided in accordance with the invention can be designed for the automated decoding of characters and/or for the optical presentation of image regions with characters not decodable in an automated manner. If both the aforesaid variants are realized simultaneously, it is possible to decode the characters decodable in an automated manner by means of the evaluation circuit and subsequently to present the characters not decodable in an automated manner optically so that they can be visually recognized by an operator. After a recognition of this type, the recognized characters can then be input manually by the operator, for example via an input medium, and can be transmitted to the evaluation circuit so that the evaluation circuit ultimately has both the characters decodable in an automated fashion and the characters not decodable in an automated fashion available for the purpose of further processing.

It is particularly advantageous, in particular with a star-shaped networking, for at least one evaluation circuit to be designed for the optical presentation of image regions delivered from different optical sensors. If, in this case, for example, an operator cannot recognize a character on the basis of the data delivered by an optical sensor, there is the possibility of having the data of a further sensor presented optically, said further sensor seeing an object, for example, at a different viewing angle at which the character to be recognized can be read more easily.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
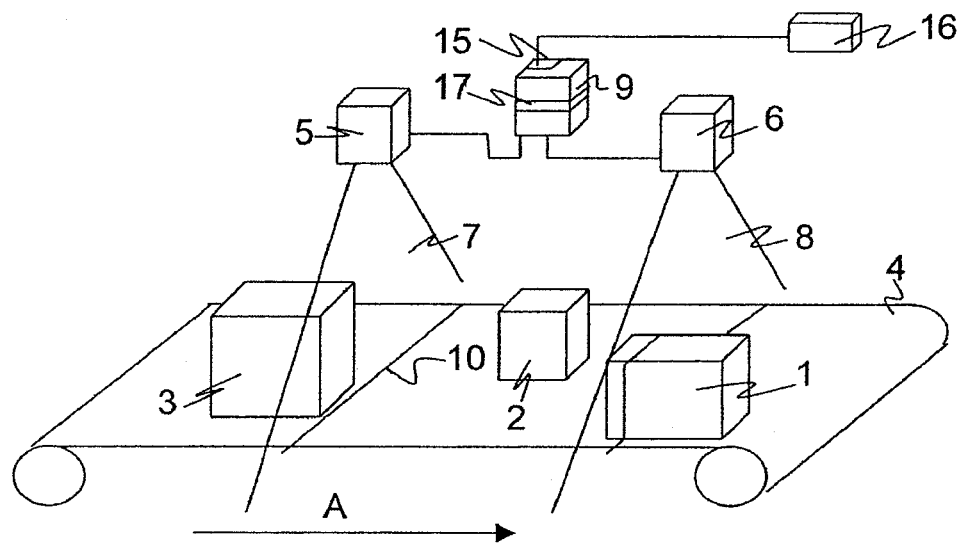
FIG. 1 is a three-dimensional elementary diagram of an apparatus in accordance with the invention.

FIG. 1 shows three objects 1, 2, 3 which are located on a conveyor belt 4 which transports the objects 1, 2, 3 in the direction of the arrow A. A laser scanner 5 and a line camera 6 are mounted sequentially in the conveying direction A above the conveyor belt 4.

The laser scanner 5 is a line scanner which is suitable to periodically transmit a laser beam moved inside a scanning plane 7. The scanning plane 7 extends perpendicular to the conveying direction A. The laser scanner 5 is positioned with respect to the conveyor belt 4 such that the transmitted laser beam scans the conveyor belt 4 over somewhat more than its total width so that all objects located on the conveyor belt 4 can be sensed by the laser scanner 5.

In a corresponding manner, the V-shaped field of view of the line camera 6 disposed within a plane 8 is aligned such that all the objects conveyed past and beneath the line camera 6 on the conveyor belt 4 can be sensed by the line camera 6. The plane 8 of the field of view of the line camera 6 extends parallel to the scanning plane 7 of the laser scanner 5 and perpendicular to the conveying direction A.

The laser scanner 5 and the line camera 6 are connected to a control and evaluation circuit 9 which is suitable to control the laser scanner 5 and the line camera 6 in the manner required in accordance with the invention, on the one hand, and also to provide an evaluation of the data delivered by the laser scanner 5 and the line camera 6, on the other hand.

The control and evaluation circuit 9 knows the spacings of the laser scanner 5 to the conveying plane of the conveyor belt 4 with respect to all those points in which the scanning plane 7 of the laser scanner 5 intersects this conveying plane. The corresponding intersection line is marked by the reference numeral 10 in FIG. 1. If now the control and evaluation circuit 9 only has spacings delivered from the laser scanner 5 which correspond to these known spacings to the conveying plane, the control and evaluation circuit knows that no object is located within the scanning plane 7 so that no ROI is present in the scanning plane 7 at the corresponding time. If, in contrast, the laser scanner 5 delivers spacing data which deviate from the known spacing data between the laser scanner 5 and the conveying plane, object surfaces are present at those positions at which the said deviations occur which do not coincide with the conveying plane but which are located more closely to the laser scanner 5 than the conveying plane. These positions are then associated with an ROI by the control and evaluation circuit 9.

It can thus be determined by means of the laser scanner 5 and the control and evaluation circuit 9 at which positions of the conveyor belt 4 objects 1, 2, 3 are located. It can then be calculated without problem from the conveying speed and the spacing between the scanning plane 7 and the field of view plane 8 of the line camera 6 when the objects 1, 2, 3 sensed by the laser scanner 5 are located in the field of view plane 8 of the line camera 6 and at which position inside this field of view plane 8 the objects 1, 2, 3 can be found. The data delivered to the control and evaluation circuit 9 by the laser camera 6 are consequently only evaluated when they are associated with an ROI. Image data which only show the conveying plane of the conveyor belt 4 without objects 1, 2, 3 located thereon are associated in accordance with the invention with regions not of interest and are not taken into account in the evaluation of the image data.

The evaluation circuit 9 is equipped with a data interface 15 via which data relating to ROIs can be transmitted to an external device 16. The external device 16 can, for example, be suitable for the automated decoding of characters.

Finally, the evaluation circuit 9 is also equipped with a compression stage 17, which is suitable to compress the data relating to ROIs in particular during their sensing so that they can then be transmitted to the external device 16 with a reduced amount via the data interface 15.

Figure 2:
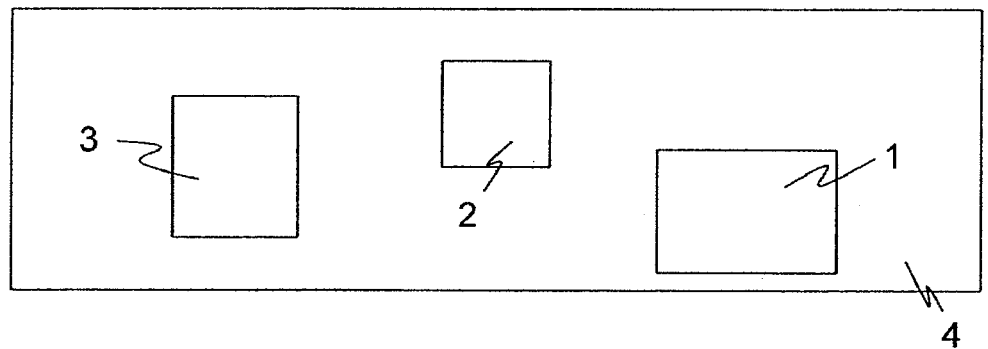
FIG. 2 is a plan view of a conveyor belt in accordance with FIG. 1.

FIG. 2 shows the objects 1, 2, 3 transported on the conveyor belt 4 in a plan view. The object surfaces which are visible in the plan view and are shown in gray in FIG. 2 are classified as ROIs by an apparatus in accordance with FIG. 1 so that the control and evaluation circuit 9 only processes image data delivered by the line camera 6 which are associated with these ROIs.

Figure 3:
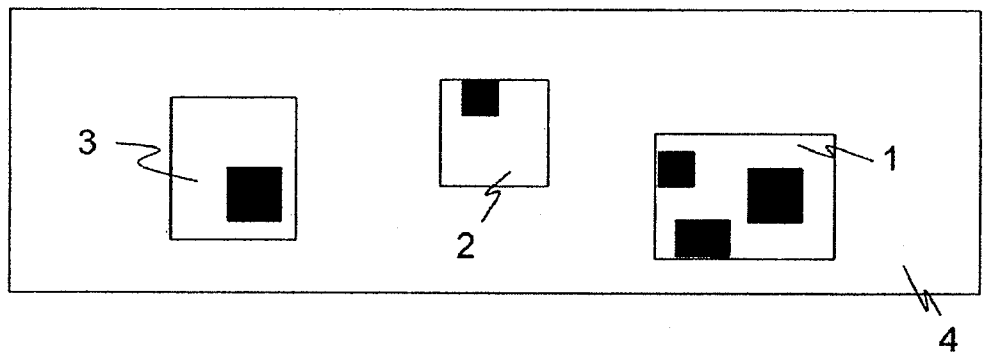
FIG. 3 is a further plan view of the conveyor belt in accordance with FIG. 1 with object regions of particular interest.

As already explained, the laser scanner 5 can additionally also be designed for the determination of the remission behavior of the object surfaces in order, in this manner, to be able to determine the positions of codes affixed to the object surfaces, for example. FIG. 3 shows a representation corresponding to FIG. 2, with here, however, only those regions of special interest being represented as ROIs marked in gray in which codes to be read by the line camera 6 in accordance with FIG. 1 are present. The total object surfaces visible from FIG. 2 therefore do not have to be taken into account by the control and evaluation unit 9 in an image processing. An evaluation of the regions of the object surfaces marked in gray in FIG. 3 is rather sufficient.

Figure 4:
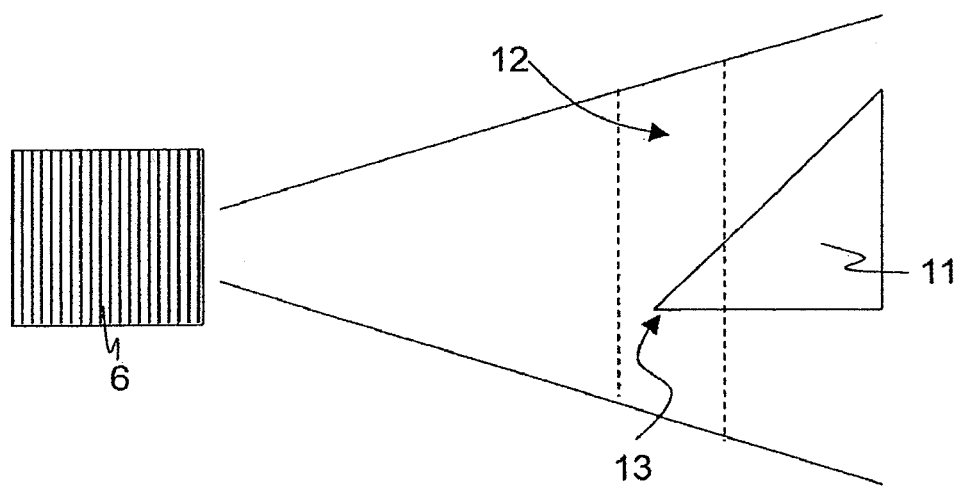
FIG. 4 is a side view of a camera and of an object with the depth of field range of the camera being marked.

FIG. 4 shows, in a side view, a line camera 6 which is aligned such that it is suitable for the sensing of an object 11 triangular in cross-section. The depth of field range of the line camera 6 is marked by 12. It can be seen from FIG. 4 that only a small region 13 of the object 11 facing the line camera 6 is located in the depth of field range 12 of the line camera 6. Within the framework of the image processing, it is accordingly sensible to process only those image data taken of the object 11 which originate from an object surface region which is located inside the depth of field region 12. The spacing between the line camera and the surfaces of the object 11 facing it can be predetermined in advance by means of the laser scanner 5 so that then ultimately only those image data are processed in the control and evaluation circuit 9 which are associated with object surface regions which are located in the depth of field region 12. In this manner, the imaging data to be processed can be reduced even further, which FIGS. 5*a* and 5*b* illustrate.

Figure 5A:
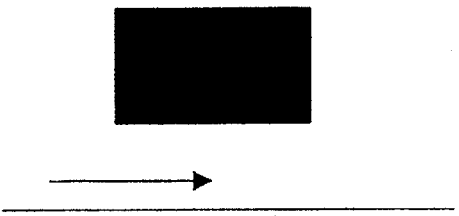
FIGS. 5*a* and 5*b* are plan views of an object in accordance with FIG. 4.
Figure 5B:
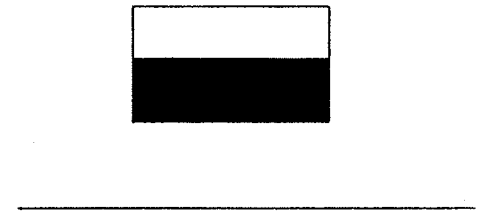

FIG. 5*a* shows all surface regions of the object 11 in a dark gray color which can be sensed by the line camera 6 in accordance with FIG. 4, and indeed independent of whether they are located within the depth of field range 12 or not.

In FIG. 5*a*, only those surface regions are shown in dark gray which can be associated with the depth of field range 12. All other surface regions of the object 11 are shown in a light gray color. In accordance with the preferred method in accordance with the invention corresponding to FIG. 4, only those image data go on to further processing by the control and evaluation circuit 9 which are marked in dark gray in FIG. 5*b* and which originate from object surface regions which are located inside the depth of field range 12 of the line camera 6. A further reduction of the ROIs defined via the laser scanner 5 is therefore possible in dependence on the depth of field range 12 of the line camera 6.

Figure 6:
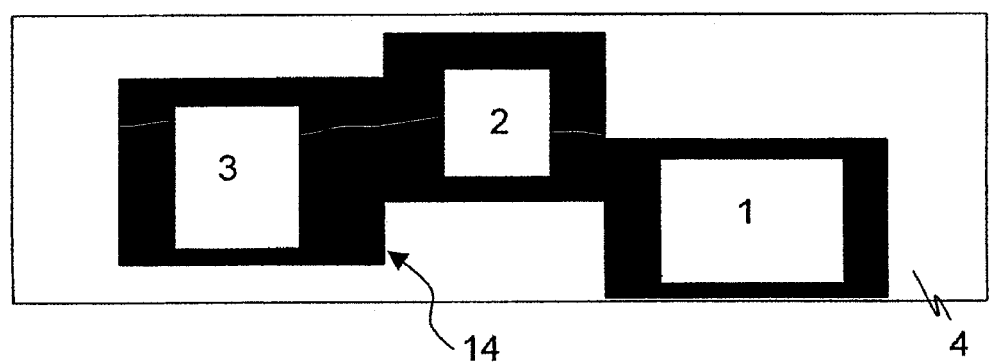
FIG. 6 is a further plan view of a conveyor belt in accordance with FIG. 1 with especially marked illuminated regions.

FIG. 6 again shows the conveyor belt in accordance with FIGS. 1 to 4, with here—in addition to the objects 1, 2, 3 hatched in dark gray in a plan view—that region 14 also being marked which can be directly illuminated by means of an object illumination device (not shown). As already explained, an illumination device can be controlled via the data determined by the laser scanner 5 such that substantially only the ROIs or regions going somewhat beyond the ROIs are illuminated. The illumination region 14 in accordance with FIG. 6 is not simultaneously illuminated. It is rather sufficient substantially to illuminate in a stripe manner only that region of the objects 1, 2, 3 which is located inside the field of view plane 8 of the line camera 6 in accordance with FIG. 1. The length and the position of the stripe-shaped region extending transversely to the conveying direction A are dependent on the ROIs determined via the laser scanner 5 and the control and evaluation circuit 9.

Figure 7:
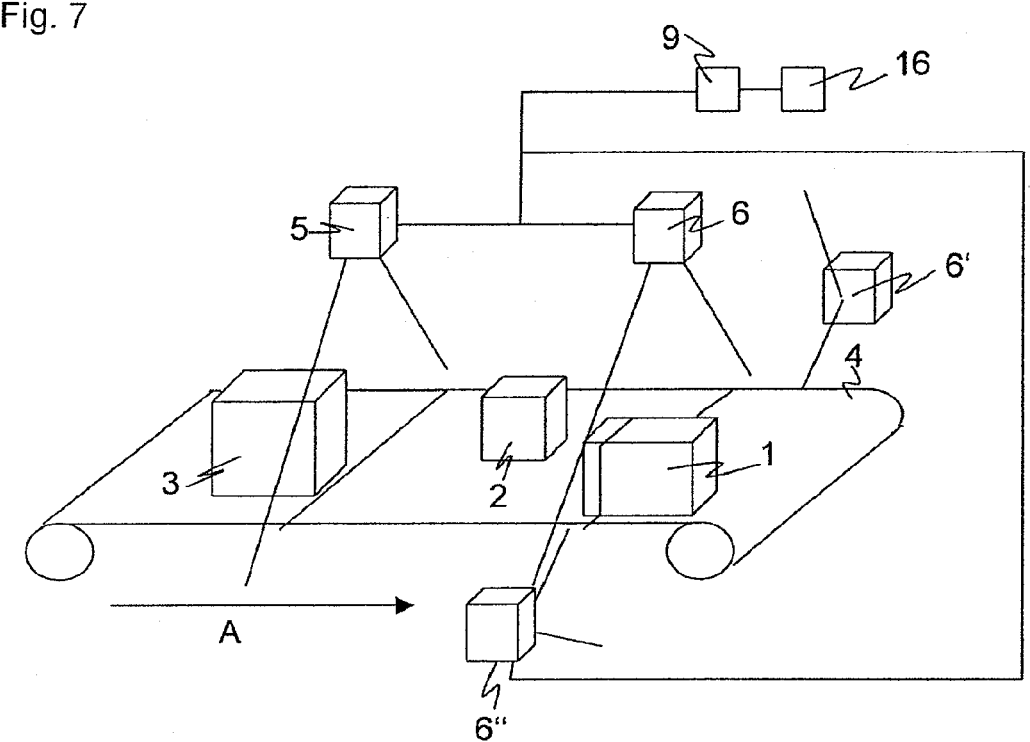
FIG. 7 is a representation in accordance with FIG. 1 having a total of three sensors.

FIG. 7 shows in an analog manner to FIG. 1 three objects 1, 2, 3 being transported on a conveyor belt 4 in the direction of the arrow A. A laser scanner 5 and a total of three line cameras 6, 6', 6" are mounted sequentially in the conveying direction A above the conveyor belt 4.

The optical axes of the three line cameras 6, 6', 6" extend perpendicular to one another, with the optical axis of the line camera 6 extending perpendicular to the plane of the conveyor belt 4 and the optical axes of the line cameras 6' and 6" extending parallel to the said plane. All the optical axes of the line cameras 6, 6', 6" extend perpendicular to the conveying direction A. The line camera 6 thus looks onto the objects 1, 2, 3 from above and the line cameras 6', 6" from oppositely disposed sides.

The laser scanner 5 and the line cameras 6, 6', 6" are connected to a control and evaluation circuit 9 which is suitable, on the one hand, to control the laser scanner 5 and the line cameras 6, 6', 6" in the manner necessary in accordance with the invention and, on the one hand, also provides the evaluation of the data delivered by the laser scanner 5 and the line cameras 6, 6', 6". The control and evaluation circuit 9 is in turn connected to an external device 16 to which the data relating to ROIs can be transmitted. In another respect, the function of the apparatus in accordance with FIG. 7 corresponds to the function of that apparatus shown in FIG. 1, with the only difference that, in accordance with FIG. 7, the data delivered from three line cameras 6, 6', 6" are available for the purpose of further processing.

Figure 8:
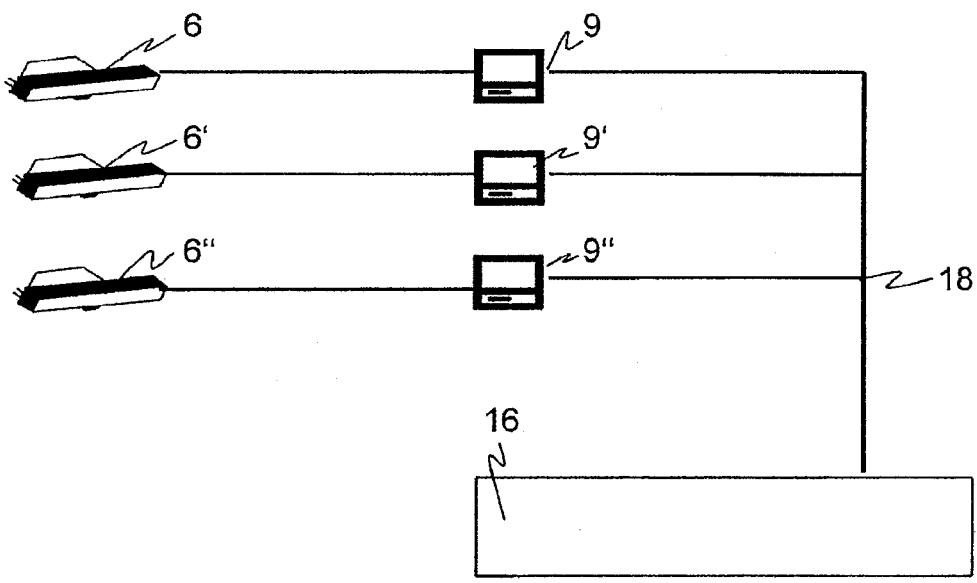
FIG. 8 is a networked arrangement of components in accordance with the invention in accordance with a first embodiment.

FIG. 8 shows, in a schematic representation, a network which has a total of three network branches in which a respective optical sensor 6, 6' and 6" and an evaluation circuit 9, 9', 9" associated with it are arranged. The outputs of the evaluation circuits 9, 9', 9" are led to a common network node 18 which is connected to a further processing station or to an external device 16. The external device is preferably a host computer which processes the data delivered from the evaluation circuits 9, 9', 9".

The evaluation circuits 9, 9', 9" are made in accordance with FIG. 8 such that they are also suitable for the optical presentation of the data delivered from the optical sensors 6, 6', 6". They furthermore each have an input medium via which the data recognized manually by an operator can be input into the evaluation circuit 9, 9', 9".

Figure 9:
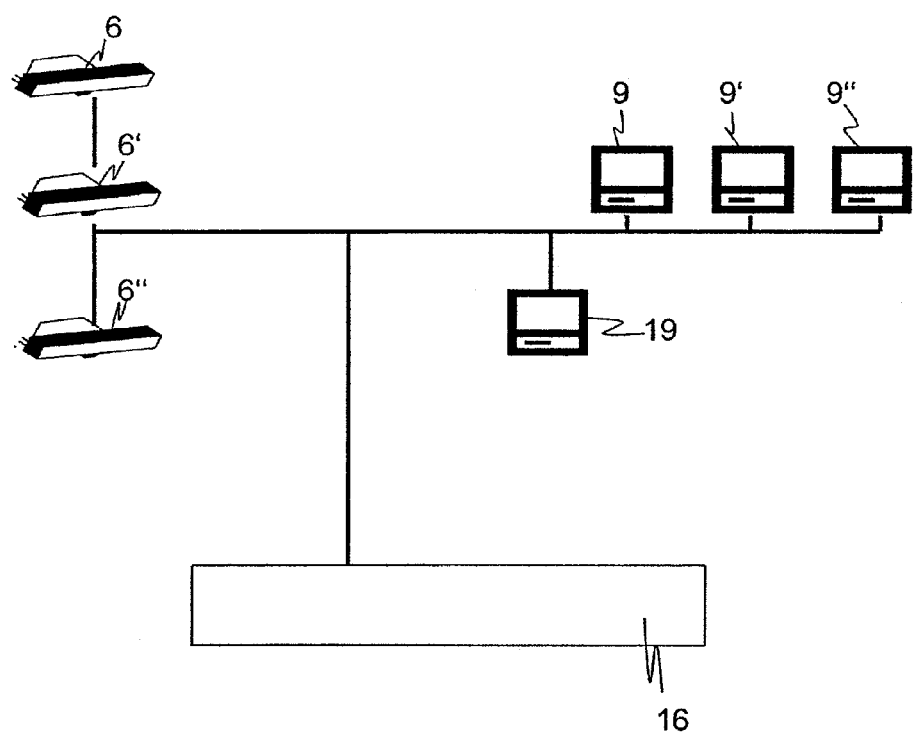
FIG. 9 is a networked arrangement of components in accordance with the invention in accordance with a second embodiment.

FIG. 9 substantially corresponds to FIG. 8 with the difference that the network here does not consist of three network branches, but rather has a star-shaped structure. In addition, a control computer 19 is provided which is designed for the coordination of the data flows and, optionally, also for the intermediate storage of data.

The fact is advantageous in an arrangement in accordance with FIG. 9 that all components 6, 6', 6", 9, 9', 9", 19 and 16 can communicate with one another within the network. The advantages already explained above are thereby achieved. It is in particular possible to present the data sensed by any desired one of the optical sensors 6, 6', 6" on the display unit of any desired evaluation circuit 9, 9', 9".

In an alternative embodiment of the arrangement in accordance with FIG. 9, it would also be possible to provide only a single evaluation circuit 9 instead of the three evaluation circuits 9, 9', 9" which is then responsible for the data of all optical sensors 6, 6', 6".

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus for sensing objects moving in a transport direction and for identifying at least one region of interest on each object comprising
   an optical sensor having a field of view;
   a device for selecting regions of interest which are associated with only a part of the field of view of the optical sensor;
   a measurement device determining spacings between the measurement device and object surfaces facing the measurement device at locations which are spaced apart from each other in a direction transverse or oblique to the transport direction; and
   an evaluation circuit coupled to the measurement device for calculating the regions of interest in dependence on the determined spacings between the object surfaces and the measurement device.

2. An apparatus in accordance with claim 1, wherein the measurement device is provided as a scanner, in particular as a laser scanner, with the measurement device including a plurality of units.

3. An apparatus in accordance with claim 2, wherein the laser scanner is designed to transmit a laser beam that is moved periodically within a scanning plane.

4. An apparatus in accordance with claim 3, wherein the scanning plane extends perpendicular or obliquely to the direction of movement of the objects.

5. An apparatus in accordance with claim 1, wherein the evaluation circuit is designed to calculate the regions of interest in dependence on the determined spacings.

6. An apparatus in accordance with claim 1, wherein the evaluation circuit is designed to take into account the depth of field range of the optical sensor such that only those regions of interest can be determined in which the object surface is located in the depth of field range of the optical sensor.

7. An apparatus in accordance with claim 1, wherein the optical sensor is provided as one of a line camera, a matrix camera and as a barcode scanner.

8. An apparatus in accordance with claim 1, wherein a conveying device, in particular a conveyor belt, is provided for moving the objects.

9. An apparatus in accordance with claim 1, wherein the evaluation circuit is designed to determine one of the resolution and the magnification factor of images sensed by the optical sensor.

10. An apparatus in accordance with claim 1, wherein the evaluation circuit is designed to determine a geometry of the objects, which takes place in dependence on the determined spacings.

11. An apparatus in accordance with claim 1, wherein the evaluation circuit is designed to determine volumes of the objects, which takes place in dependence on the determined spacings.

12. An apparatus in accordance with claim 1, wherein a camera focusing device is provided, which is acted on in dependence on the determined spacings.

13. An apparatus in accordance with claim 1, wherein an object illumination device is provided, which can be controlled via the evaluation circuit such that regions of interest are illuminated and regions not of interest are not illuminated.

14. An apparatus in accordance with claim 13, wherein the light sources of the object illumination device are designed as LEDs.

15. An apparatus in accordance with claim 1, wherein an object illumination device is provided, which can be controlled via the evaluation circuit such that regions of interest are illuminated more strongly than regions not of interest.

16. An apparatus in accordance with claim 1, wherein at least one of the optical sensor and the evaluation circuit has a data interface for transmitting data relating to regions of interest to an external device.

17. An apparatus in accordance with claim 16, wherein the external device is designed for automated decoding of characters and for optical presentation of image regions with characters not decodable in an automated manner.

18. An apparatus in accordance with claim 16, wherein at least one of the optical sensor and the evaluation circuit is equipped with a compression stage for compressing data relating to regions of interest and transmitting the compressed data via the data interface.

19. An apparatus in accordance with claim 18, wherein the compression stage is designed for compressing image data relating to regions of interest during the sensing of the respective image.

20. An apparatus in accordance with claim 1, wherein at least two optical sensors are provided which sense the moved objects at different viewing angles.

21. An apparatus in accordance with claim 20, wherein the optical axes of the optical sensors stand perpendicular to one another.

22. An apparatus in accordance with claim 20, wherein the optical axes of the optical sensors extend perpendicular or obliquely to the direction of movement of the objects.

23. An apparatus in accordance with claim 20, wherein the optical axis of an optical sensor extends perpendicular to a conveying plane on which the objects are moved.

24. An apparatus in accordance with claim 20, wherein the optical sensors are connected to one or more evaluation circuits via a data network.

25. An apparatus in accordance with claim 24, wherein the optical sensors are connected to the evaluation circuit or circuits in star shape via a data network.

26. An apparatus in accordance with claim 24, wherein an optical sensor and an evaluation circuit associated with it are located in a respective network branch, with outputs of the evaluation circuits being led to a common network node, which is in turn connected to a further processing station.

27. An apparatus in accordance with claim 20, wherein a respective evaluation circuit is associated with each optical sensor.

28. An apparatus in accordance with claim 20, wherein at least one evaluation circuit is designed for optical presentation of image regions delivered from different optical sensors.

29. An apparatus in accordance with claim 1, wherein the evaluation circuit is designed for automated decoding of characters and for the optical presentation of image regions with characters not decodable in an automated manner.

30. An apparatus in accordance with claim 1, wherein the evaluation circuit has an input medium for manual input of visually presented characters.

31. An apparatus according to claim 1 wherein the measurement device is adapted to calculate the regions of interest in dependence on the predetermined spacings and on remissions from the object.

32. A method for sensing objects moving in a transport direction and for identifying at least one region of interest on each object comprising
 moving the objects past an optical sensor having a field of view;
 a device for selecting regions of interest on the object which are associated with only a part of the field of view of the optical sensor;
 a measurement device determining spacings between the measurement device and object surfaces facing the measurement device at locations which are spaced apart from each other in a direction transverse or oblique to the transport direction; and
 calculating the regions of interest with an evaluation circuit in dependence on the determined spacings between the object surfaces and the measurement device.

33. A method in accordance with claim 32, further comprising compressing every completely received image line relating to a region of interest directly after being sensed when the optical sensor is designed as a line camera and when a compression stage is used.

34. A method in accordance with claim 32, further comprising compressing a predetermined number of received pixels of one or more image lines relating to a region of interest directly after sensing the number of pixels when the optical sensor is designed as a line camera and when a compression stage is used.

35. A method in accordance with claim 32, further comprising compressing a predetermined number of completely received image lines relating to a region of interest directly after the sensing of the said number of image lines when the optical sensor is designed as a line camera and when a compression stage is used.

36. A method in accordance with claim 32, further comprising:
 calculating the regions of interest based on the determined spacings; and
 determining one of a resolution and a magnification factor of the images sensed by the optical sensor using the evaluation circuit.

37. A method according to claim 32 including calculating the regions of interest in dependence on the determined spacings and on remissions from the object.

38. An apparatus for sensing objects on a surface and moving in a transport direction for identifying at least one region of interest on each object comprising
 an optical sensor having a field of view;
 a device for selecting regions of interest which are associated with only a part of the field of view of the optical sensor;
 a measurement device determining spacings between the measurement device and the surface and between the measurement device and object surfaces facing the measurement device at locations which are spaced apart from each other in a direction transverse or oblique to the transport direction; and
 an evaluation circuit coupled to the measurement device which determines that a region of interest is present when the spacing between the object surfaces and the measurement device does not coincide with the spacing between the measurement device and the surface.

39. An apparatus according to claim 38 wherein the spacing between the object surface and the measurement device is less than the spacing between the measurement device and the surface.

40. A method for sensing objects on a support surface and moving in a transport direction for identifying at least one region of interest on each object comprising
 moving the objects past an optical sensor having a field of view;
 a device for selecting regions of interest on the object which are associated with only a part of the field of view of the optical sensor;
 a measurement device determining spacings between the measurement device and the surface and between the measurement device and object surfaces facing the measurement device at locations which are spaced apart from each other in a direction transverse or oblique to the transport direction; and
 determining with an evaluation circuit that a region of interest is present when the spacing between the object surfaces and the measurement device does not coincide with the spacing between the measurement device and the surface.

41. A method according to claim 40 wherein the spacing between the object surface and the measurement device is less than the spacing between the measurement device and the surface.

* * * * *